United States Patent [19]

Suzuki et al.

[11] Patent Number: 4,814,906

[45] Date of Patent: Mar. 21, 1989

[54] MAGNETIC HEAD SLIDER

[75] Inventors: Shoji Suzuki, Ibaraki; Toshinori Kazama, Hiratsuka; Hiroshi Daitou, Odawara; Yoshinori Takeuchi, Ibaraki; Yuzo Yamaguchi, Tsuchiura, all of Japan

[73] Assignee: Hitachi, Ltd., Tokyo, Japan

[21] Appl. No.: 23,241

[22] Filed: Mar. 9, 1987

[30] Foreign Application Priority Data

Mar. 7, 1986 [JP] Japan ................................. 61-48342

[51] Int. Cl.$^4$ ........................ G11B 5/60; G11B 21/21
[52] U.S. Cl. ..................................... 360/75; 360/103; 360/104
[58] Field of Search ......................... 360/103, 75, 104

[56] References Cited

U.S. PATENT DOCUMENTS

| | | | |
|---|---|---|---|
| 3,678,482 | 7/1972 | Billawala | 360/103 |
| 3,855,625 | 12/1974 | Garnier et al. | 360/103 |
| 4,081,846 | 3/1978 | Roscamp et al. | 360/103 |
| 4,420,780 | 12/1983 | Deckert | 360/103 |
| 4,490,766 | 12/1984 | Hill et al. | 360/137 |
| 4,553,184 | 11/1985 | Ogishima | 360/103 |

FOREIGN PATENT DOCUMENTS 0015383  1/1982  European Pat. Off. .
55-55478  4/1980  Japan .

OTHER PUBLICATIONS

Carothers et al., "A New . . . Packs", Fall Joint Computer Conference, 1963, pp. 327–340.

Primary Examiner—Robert S. Tupper
Attorney, Agent, or Firm—Antonelli, Terry & Wands

[57] ABSTRACT

A magnetic head slider for use with a magnetic recording medium has a bearing surface which opposes to the magnetic recording medium and generates a pneumatic bearing effect for floating the magnetic head slider above a surface of the magnetic recording medium. The bearing surface includes a tapered surface portion constituting an air entrance and a flat rail portion connected to the tapered surface portion. The magnetic head slider has vent holes formed in the flat rail portion penetrating through the magnetic head slider from the flat rail portions to an end surface of the slider opposite to the magnetic recording medium.

26 Claims, 10 Drawing Sheets

MAGNETIC HEAD SLIDER

FIELD OF THE INVENTION AND RELATED ART STATEMENT

The present invention generally relates to a magnetic head slider and a magnetic disk apparatus incorporating the same. More particularly, the present invention is concerned with a magnetic head slider and a magnetic disk apparatus, as well as a method of producing a magnetic disk, which are capable of eliminating any unfavorable effect caused by airborne debris or particles and other contaminants, thereby improving the reliability thereof.

In order to improve the reliability of a magnetic disk apparatus, particularly for the purpose of eliminating an accidental contact between a magnetic head slider and a magnetic disk (or called "Head Crash"), it is necessary to remove any airborne particles intruded between the magnetic head slider and the magnetic disk and any debris attracted onto the disk during manufacture thereof, and to impart a superior dynamic performance to the magnetic head slider so as to enable the magnetic head slider to stably float above a surface of the magnetic disk.

Various proposals have been made to cope with such demands. For instance, U.S. Pat. No. 4,490,760 proposes to blow off any fine particles from the surface of the magnetic disk by a controlled movement of an access mechanism of the magnetic head slider.

A magnetic head slider capable of floating above the disk surface is shown in PROCEEDINGS FALL JOINT COMPUTER CONFERENCE, 1963 P327-P340, in which a cylindrical surface with a crown is provided with air vent holes. Meanwhile, Japanese Unexamined Patent Publication No. 55478/1980 discloses a magnetic head slider having a bearing surface opposing to the disk surface, a part of which is etched to provide etched grooves. The bottom surfaces of the etched grooves are provided with through holes each extending from the etched groove bottom surface to the other end surface of the slider, thus minimizing an air bearing effect of the etched portions.

In order to cope with a current demand for higher integration of magnetic disk apparatus, it is necessary to enhance the positional precision of the head slider with respect to the magnetic disk and to reduce a distance between the head slider and the magnetic head disk. The arts described above, however, cannot stably maintain such distance and is not able to scatter out fine particles from a laminar sub-layer of about 100 μm thickness formed on the magnetic disk to a region far from the laminar sub-layer.

OBJECT AND SUMMARY OF THE INVENTION

Accordingly, an object of the present invention is to provide a magnetic head slider which is capable of removing debris and wear particles from the laminar sub-layer on the magnetic disk to a region remote from the laminar sub-layer and preventing these particles from being re-attracted onto the magnetic disk, and is capable of being applied to "CSS" (Contact Start Stop) system while exhibiting a stable dynamic performance even in a condition in which the magnetic head slider is apart upwards from the magnetic disk at a smaller distance of sub-micron order.

Another object of the present invention is to provide a magnetic head slider supporting device capable of enabling the head slider to stably follow up the disk surface, as well as a magnetic disk apparatus incorporating such head slider and supporting device.

Still another object of the present invention is to provide a method of producing a magnetic disk having a magnetic head slider capable of removing dusts and other particles from the magnetic disk surface.

To these ends, according to the present invention, there is provided a magnetic head slider for use with a magnetic disk as a magnetic recording medium and having a bearing surface which opposes to the magnetic recording medium and adapted for generating a pneumatic bearing effect for floating the magnetic head slider above the surface of the magnetic recording medium, the bearing surface including tapered surfaces constituting an air entrance and flat rails connected to the tapered surfaces, characterized by at least one vent hole formed in each of the flat rails, which penetrates the magnetic head slider from the surface of the flat rail to the opposite side of the slider.

DESCRIPTION OF THE PREFERRED EMBODIMENTS

Preferred embodiments of the present invention will be described hereinunder with reference to the accompanying drawings.

Figure 1:
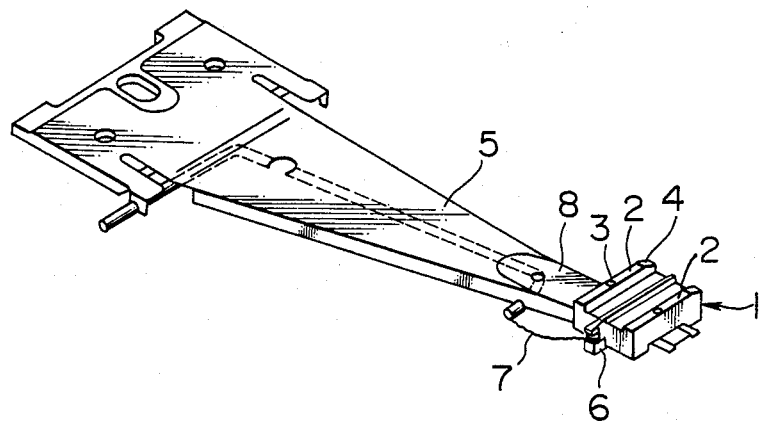
FIG. 1 is a perspective view showing a device for supporting a magnetic head slider in accordance with one embodiment of the present invention.

Referring to FIG. 1, a magnetic head slider 1 has tapered portions 4 serving as a bearing surface opposing to a magnetic disk for a pneumatic bearing effect and flat rails 2, and carries a magnetic head 6. Vent holes 3 are formed in the flat rails 2 penetrating through the magnetic head slider 1. The tapered surfaces serve as surfaces along which air is introduced into the gap between the magnetic head slider and the magnetic disk. The magnetic head slider 1 is secured to and resiliently supported by gimbals 8 and is connected to a head slider supporting member 5 through the gimbals 8. Picked up electric signals are transfered from the magnetic head 6 to a read/write circuit through a lead wire 7 extending upon the head slider supporting member 5.

Figure 2:
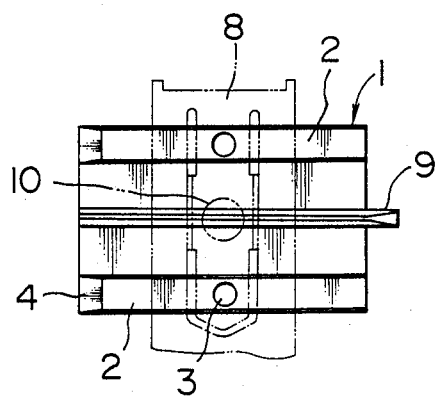
FIG. 2 is a plan view showing the magnetic head slider shown in FIG. 1.

As apparent from FIG. 2, one vent hole 3 is provided on each side of a pivot 10 provided on the gimbals 8. The two flat rails 2 extend in a longitudinal direction at both sides of the magnetic head slider 1. A center rail 9 extends in a longitudinal direction of the magnetic head slider 1 at a center of the latter.

Figure 3:
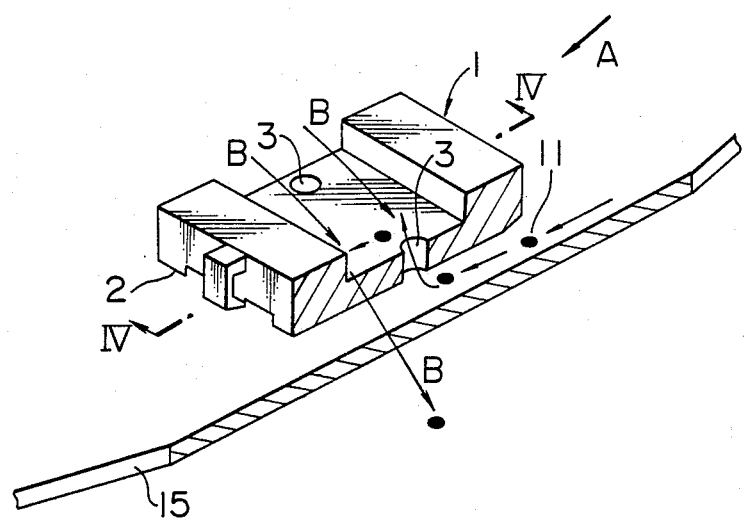
FIG. 3 is a perspective view of the magnetic head slider shown in FIG. 1.
Figure 4:
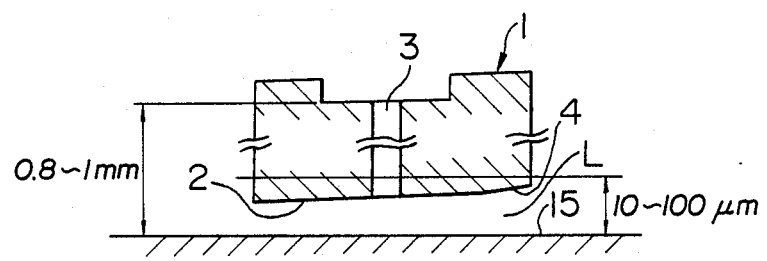
FIG. 4 is a sectional view taken along the line IV—IV of FIG. 3.

The operation of this magnetic head slider 1 will be explained hereinunder with reference to FIGS. 3 and 4. During rotation of the magnetic disk, air is pressurized at the pneumatic bearing portions, i.e., between the flat rails 2 and a magnetic disk 15. A part of the pressurized air is relieved to a rear side of the magnetic head slider 1 through the vent holes 3. Thus, airborne debris and other contaminant particles 11 are therefore led out to a region remote sufficiently from a laminar sub-layer L which is formed, as shown in FIG. 4, on a surface of the magnetic disk 15. The debris and other contaminant particles 11 thus led out are then discharged to the outside of the magnetic disk 15 along an air flow which is generated in accordance with the rotation of the disk 15 in the direction of arrow A and directed radially outwards indicated by an arrow B. Thus, the debris and contaminant particles 11 are prevented from being re-attracted to the surface of the magnetic disk 15. For the same reason, the debris and contaminant particles 11 are prevented from being attracted to the magnetic head slider 1.

In the magnetic head slider 1, the air is first compressed along the tapered surfaces 4. The pressure is somewhat reduced at the central portion of the flat rail 2, and rises again at the rear end portion of the flat rail 2. In consequence, peaks of the air pressure appears at the boundary portion between the entrance tapered surface 4 and the flat rail 2 and at the rear end portion of the flat rail 2. The pneumatic pressure thus developed produces a force which balances the force which urges downwards the magnetic head slider 1, so that the magnetic head slider 1 can float above the magnetic disk 15. The flying height, the posture and the dynamic performance of the magnetic head slider 1 varies depending on the manner how the urging force acting on the magnetic head slider 1 is balanced by the force produced by the pneumatic pressure. It will be understood that the pneumatic pressure distribution along the length of the flat rail 2 can be varied by the provision of the vent holes 3 in the flat rails 2. In addition, the relief of air through the vent holes 3 produces a damping or attenuation effect to stabilize the magnetic head slider 1. For these reasons, the magnetic head slider 1 of this embodiment exhibits a superior floating characteristics.

Regarding the size of the vent holes 3, it is to be noted that a stable floating characteristic of the magnetic head slider 1 can be obtained even when the vent hole 3 has a diameter which approximates the width of the flat rail 2. In this case, most of the air containing therein the debris and other contaminant particles reaches the vent hole 3, so that a large proportion of the debris and other contaminant particles is discharged through the vent hole. Consequently, any risk of inclusion of debris nd other contaminant particles can be reduced remakably.

Figure 5:
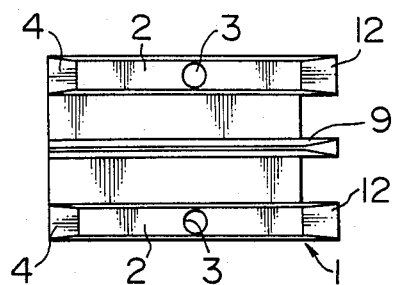
FIGS. 5 and 6 are plan views showing other embodiments of the magnetic head sliders of the present invention, respectively, each having a negative pressure region.
Figure 6:
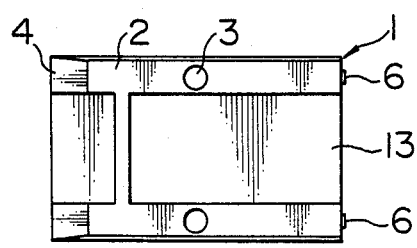

FIGS. 5 and 6 show other embodiments each of which has a negative pressure region therein. The term "negative pressure" region is used to mean a region in which the air pressurized under the flat rail is expanded to a level below the atmospheric pressure. More specifically, in the magnetic head slider 1 shown in FIG. 5, a negative pressure region is constituted by a tapered portion 12 formed on a rear end portion of each flat rail 2. A vent hole 3 provides a function for discharging the debris and other contaminant particles, thus preventing these particles stacking on the tapered portion 12. FIG. 6 shows a magnetic head slider 1 with a recessed region defined by a recessed surface 13. Since a negative pressure is established in this region, the magnetic head slider 1 is pressed towards the magnetic disk by a force greater than the initial pressing force. Thus, the pressing force acting on the magnetic head slider 1 is seemingly increased so as to improve the dynamic performance of the magnetic head slider 1 against the movement of the magnetic disk. On the other hand, the greater pressing force acting on the magnetic head slider 1 causes a problem that smooth vertical movement of the magnetic head slider 1 is impaired when the slider 1 contacts the debris and other contaminant particles on the magnetic disk. However, the continuous discharge of particles through the vent holes 3 reduces the unfavorable effect of these particles, thus enabling the negative-pressure effect to exert its full merit.

Figure 7:
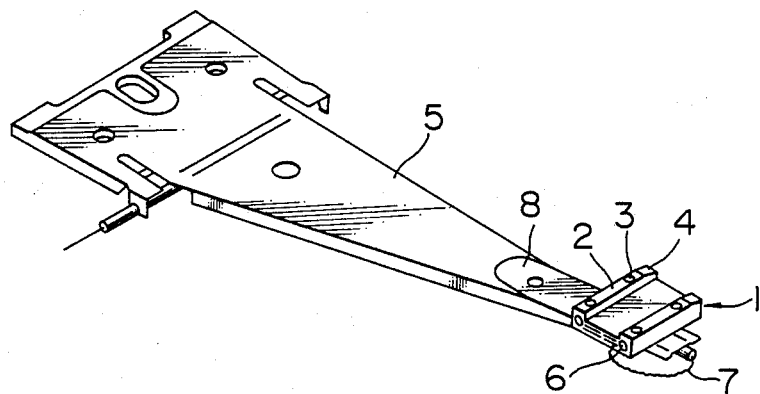
FIG. 7 is a perspective view showing a device for supporting still another embodiment of the magnetic head slider of the present invention.
Figure 8:
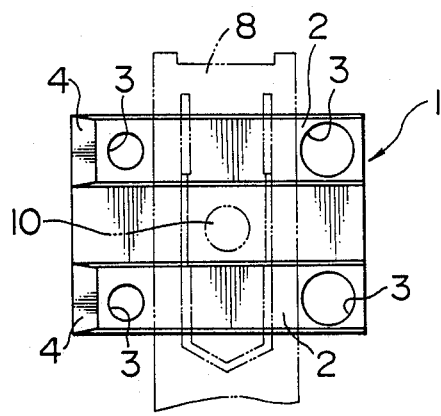
FIG. 8 is a plan view showing the magnetic head slider shown in FIG. 7.

FIGS. 7 and 8 show still another embodiment in which two vent holes 3 are formed in each flat rail 2. Referring to FIG. 7, the magnetic head slider 1, which is of thin-film head 6 type, has tapered surfaces 4 and flat rails 2, and is connected to a supporting member 5 through gimbals 8. Four vent holes 3 are formed in portions other than the points at which the magnetic head slider 1 is connected to the gimbals 8. By providing two vent holes 3 in each flat rail 2, it is possible to easily optimize the distribution of the pneumatic pressure developed between the flat rail 2 and the magnetic disk. Thus, these vent holes provides an effect to improve the floating stability of the magnetic head slider 1, in addition to the function for discharging debris and other contaminant particles.

Figure 9:
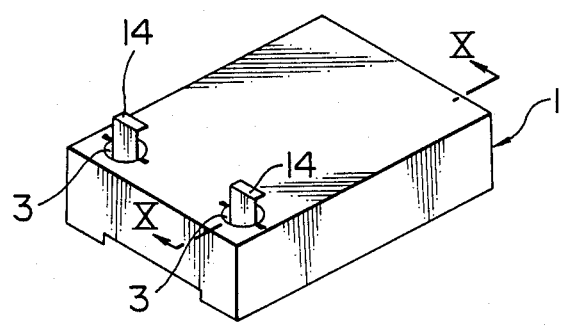
FIG. 9 is a perspective view of a further embodiment of the magnetic head slider in accordance with the present invention having an air guiding plate provided in a vent hole.
Figure 10:
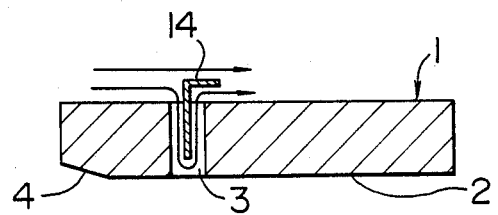
FIG. 10 is a sectional view of the magnetic head slider taken along the line X—X in FIG. 9.

FIGS. 9 and 10 show a further embodiment in which an air guiding plate 14 is provided in each vent hole 3. The air guide plate 14 enables a circulation of the air in the vent hole 3 more quickly and readily than in the case where no air guide plate 14 is provided. The air guide plate 14 is formed, for example, by etching a stainless steel sheet and bending the same. The thus formed air guide plate 14 is suitably bonded to the magnetic head slider 1.

Figure 11:
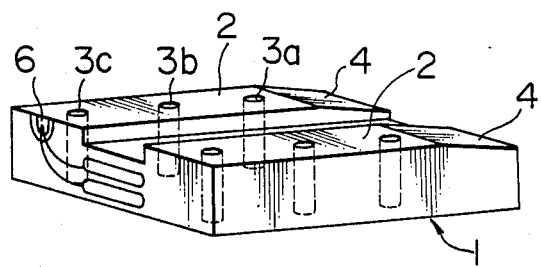
FIG. 11 is a perspective view of a further embodiment of the present invention having a plurality of vent holes formed in the flat rail portion.

Referring now to FIG. 11, there are three vent holes 3a, 3b and 3c formed in each flat rail 2 on a magnetic head slider 1. More specifically, the vent hole 3a is disposed near the air entrance end at a position where it does not interfere with the tapered surface 4. The vent hole 3c is disposed near the rear end portion of the flat rail 2. The vent hole 3b is disposed intermediate between these two holes 3a and 3c. These three vent holes 3a, 3b, 3c penetrate through the magnetic head slider 1 from one to the other side thereof. In this embodiment, a saddle-like pattern of pneumatic pressure distribution is obtained along the length of the flat rail 2 by virtue of three vent holes provided in each flat rail 2, thereby further improving the floating stability of the magnetic head slider 1.

In order to remove the debris and other contaminant particles from the surface of the magnetic disk, it suffices only that at least one of three vent holes 3a, 3b and 3c reaches the end opposite to the magnetic disk slider 1. In other words, the remaining two holes need not always penetrate to the opposite side of the magnetic head slider 1. In such a case, these two non-through holes serve as pressure regulating holes which contribute to the stabilization of the floating of and the small flying height of the magnetic head slider. The manner in which the vent hole and the pressure regulating holes are combined may be varied depending on the conditions such as the required characteristics of the magnetic head slider.

Figure 12:
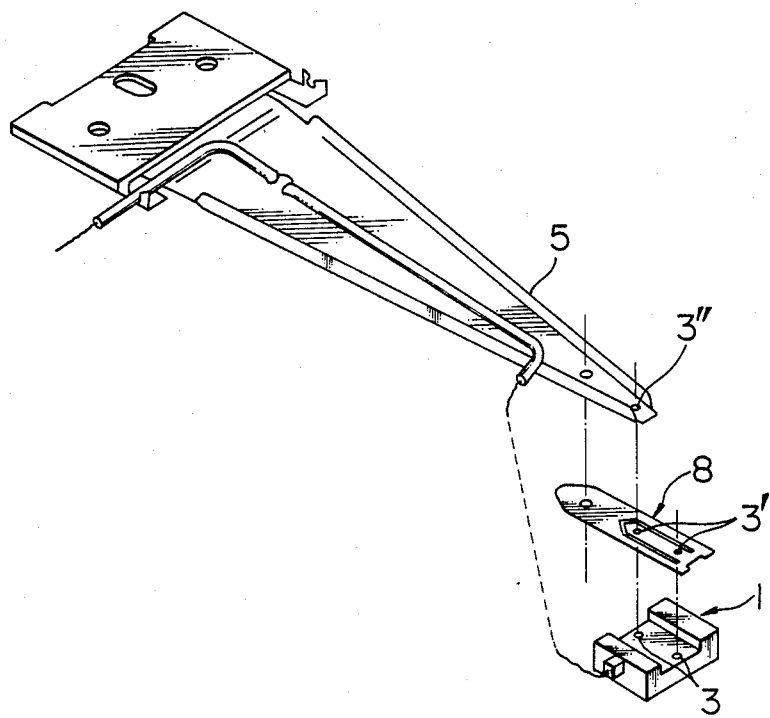
FIG. 12 is an exploded view of a supporting device for a magnetic head slider of the invention having vent holes.

An explanation will be made hereinunder as to the device for supporting the magnetic head slider 1. Referring to FIG. 12, air passage holes 3', 3" capable of communicating with the vent holes 3 in the magnetic head slider 1 are also formed in the gimbals 8 and the slider supporting member 5. With this arrangement, it is possible to remove the fine particles from the surface of the magnetic disk to a region apart from the magnetic disk.

In the foregoing embodiments, the vent hole has a diameter which ranges between 40% and 90% of the width of the flat rail, and is preferably formed by a supersonic processing, laser-beam processing or the like.

Figure 13:
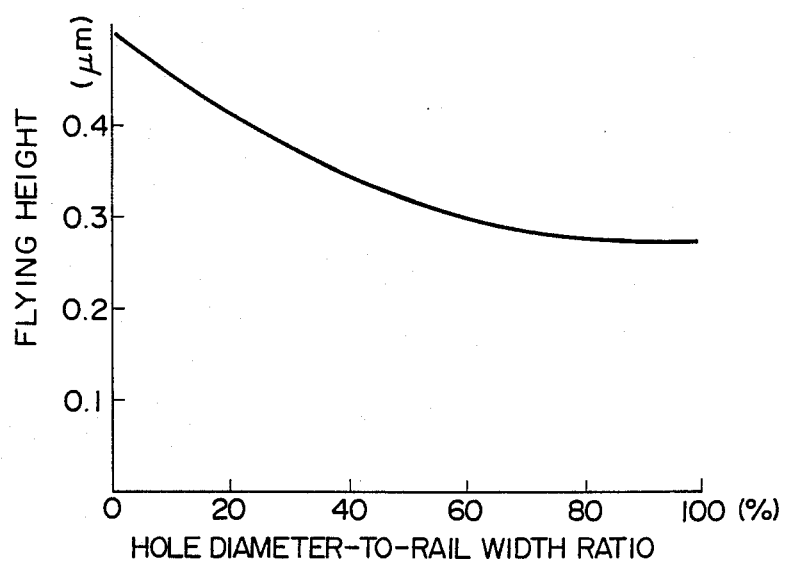
FIG. 13 is a diagram showing a relationship between a diameter of the vent hole and an amount of flying height of the magnetic head slider above the magnetic disk.
Figure 14:
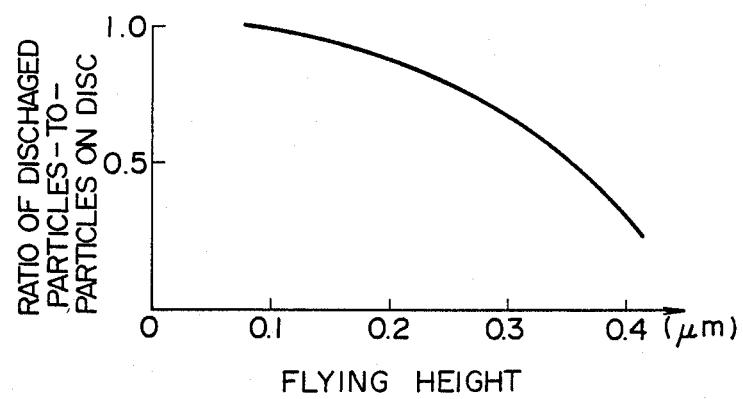
FIG. 14 is an illustration of a relationship between the amount of flying height of the magnetic head slider and an amount of discharge of dust particles.

As will be seen from FIG. 13, the flying height is decreased as the diameter of the vent hole is increased. It is, however, possible to obtain the required flying height by suitably selecting the width of the flat rail. It will be seen also that the flying height is substantially constant when the ratio exceeds 80%. This is attributable to a fact that the share of the pressure on the surface of the flat rail varies along the width thereof. Namely, both widthwise end portions of the flat rail does not materially contribute to the bearing effect, so that any change in the diameter within such marginal regions does not produce any particular change in the effect of the vent hole. For these reasons, it is preferred that the diameter of the vent hole exceed, although not exclusively, 80% of the width of the flat rail. It will be also understood that the greater the diameter of the vent hole becomes, the greater the effect for discharging debris and other contaminant particles becomes (see FIG. 14). From a practical point of view, the vent holes are formed in the portions of the flat rails in alignment with the pivot 10 as shown in FIG. 2 or in fore and after portions of the flat rail, although the locations of the holes can be selected freely along the length of the flat rails without being accompanied by a reduction in the effect for removing the debris and other contaminant particles. Although the number of and the shape of the vent holes should be determined in accordance with the required performance such as the required flying height of the magnetic head slider, as well as conditions in the production thereof, a cylindrical form is preferred for the vent hole from the production point of view.

Figure 15:
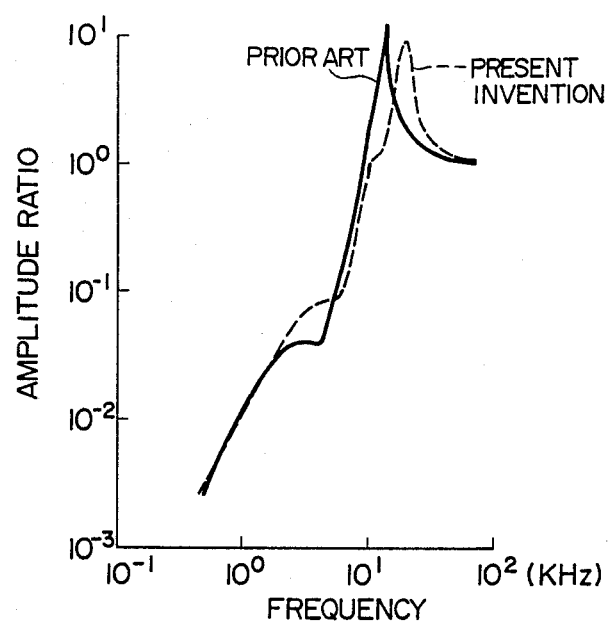
FIGS. 15, 16 and 17 are graphs which show the dynamic performance of the magnetic head slider of the invention in comparison with that of a known magnetic head slider.
Figure 16:
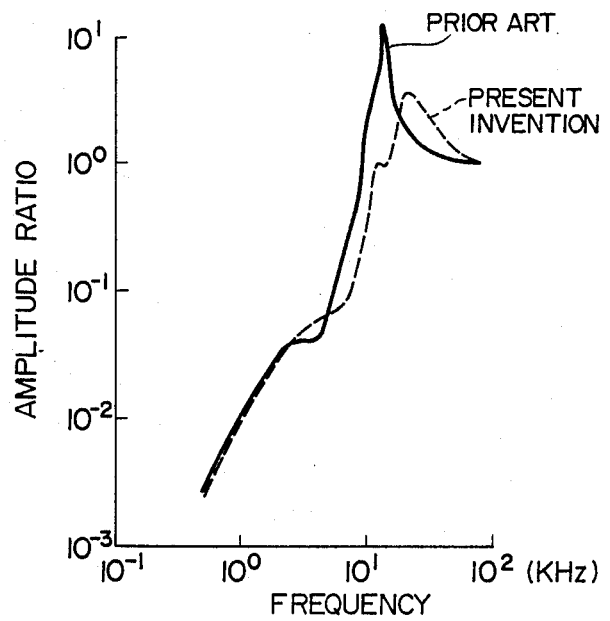
Figure 17:
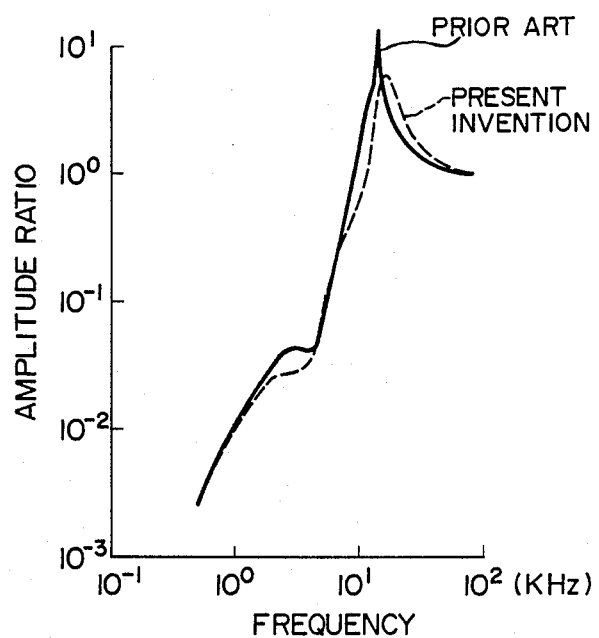

FIGS. 15, 16 and 17 show the dynamic performance of the magnetic head slider, more particularly, an amount of change of the flying height of the magnetic head slider from the initial value of the flying height in response to a vertical displacement of the magnetic disk surface. More specifically, in FIG. 15, a broken-line curve shows the characteristic of a magnetic head slider embodying the present invention, while a solid-line curve shows the characteristic exhibited by a conventional magnetic head slider which has the same flat rails and tapered surfaces as those in the slide of the invention but devoid of the vent holes. As will be seen from this FIG., the invention raises the resonance frequency from about 11 KHz to about 18 KHz, while reducing the amplitude ratio. This proves that the damping characteristic of the pneumatic spring formed between the magnetic disk and the magnetic head slider is improved by the presence of the vent holes 3. It will be seen that, according to the invention, it is possible to obtain a superior dynamic performance of the slider by virtue of the damping effect offered by the air discharge from the vent holes 3.

The embodiments of the magnetic head slider of the invention shown in FIG. 6 and FIG. 8 were respectively compared with a conventional magnetic head slider in terms of the dynamic performance of the slider bearing, the results of which are shown in FIGS. 16 and 17, respectively. It will be seen that FIGS. 16 and 17 show the same tendency as FIG. 15: namely, a higher dynamic performance of the magnetic head slider of the invention as compared with conventional sliders, by virtue of the damping effect offered by the air discharge from the vent holes.

Figure 18:
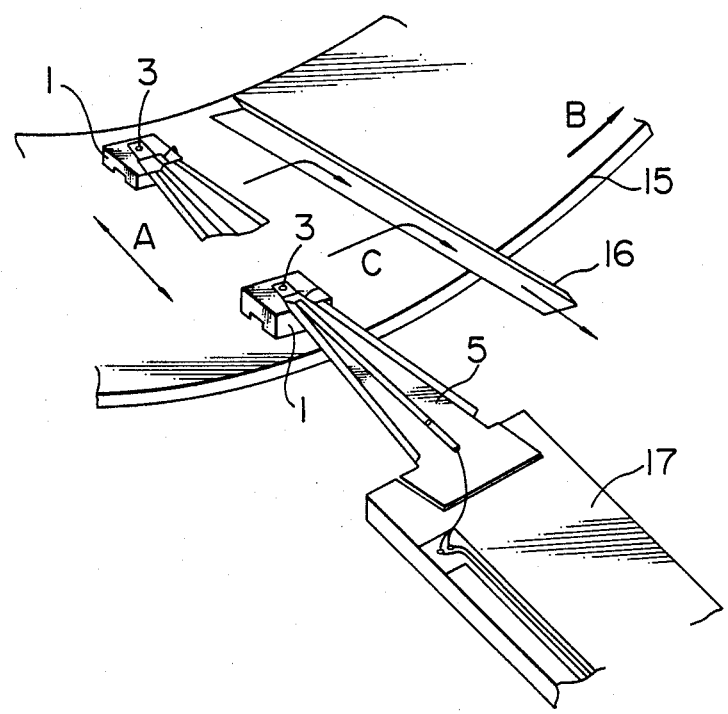
FIG. 18 is a perspective view of a part of a magnetic disk apparatus embodying the present invention.

Referring to FIG. 18, the magnetic head slider 1 having vent holes 3 is supported by the head slider supporting member 5 which is connected to a guide arm 17. The slider 1 is adapted to be moved in a seeking direction shown by an arrow A in accordance with the movement of the guide arm 17 to which driving power is transmitted from a driving means (not shown). A magnetic disk 15 is disposed so as to oppose to the magnetic head slider 1 and is rotated in a direction indicated by an arrow B. A guide member 16 serving as an air guide means is disposed downstream from the magnetic head slider 1 in respect of the rotational direction of the disk 15 so as to deflect the stream of air accompanying the rotating disk to the radial outside of the magnetic disk 15. This guide member 16 has a V-shaped cross-section. Therefore, any debris and other contaminant particles coming into the gap between the rotating disk 15 and the magnetic head slider 1 floating above the disk 1 are separated from the laminar sub-layer on the rotating disk 15 and introduced upward through the vent holes 3 together with air. The air thus discharged and containing the debris and other contaminant particles is then caught by the air guide member 16 before the disk 15 makes one full rotation, so that the debris and other contaminant particles are discharged to the outside of the magnetic disk along the V-shaped passage formed in the air guide member 16.

Figure 19:
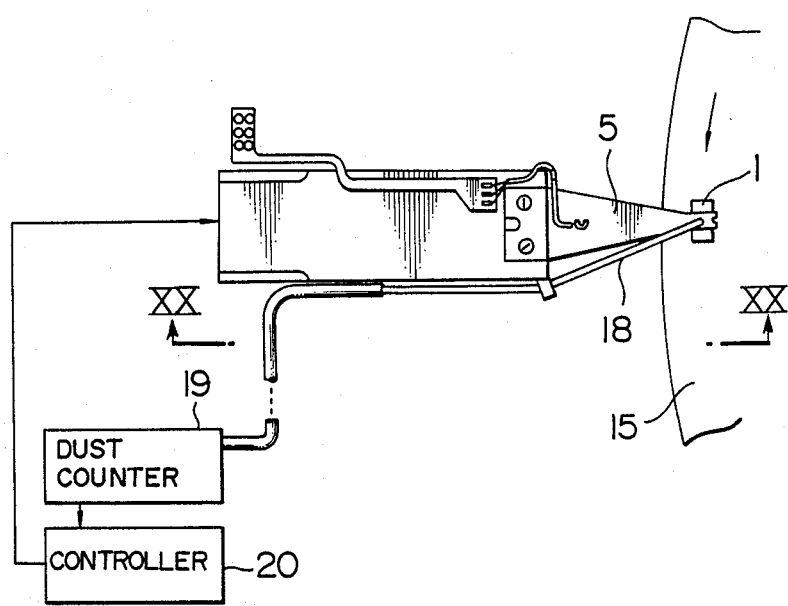
FIG. 19 is a plan view showing a magnetic disk apparatus of the present invention including a control device.
Figure 20:
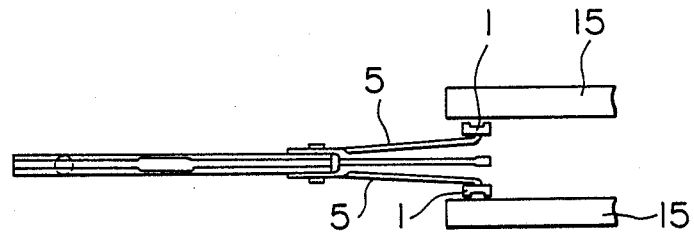
FIG. 20 is a side elevational view of the magnetic disk apparatus seen from the line XX—XX in FIG. 19.

Referring to FIG. 19, the magnetic head slider 1 has vent holes. The airborne debris and other contaminant particles emitting from the vent holes are collected into a dust counter 19 through a suction means 18. The dust counter 19 measures the content of the debris and other contaminant particles in the air and sends information concerning the content to a controller 20. The controller 20 conducts an arithmetic operation for comparing the data representing the content of the airborne particles with a predetermined level, and sends the result of the comparison as a status information representing the present status of the magnetic disk apparatus to a host controller. The host controller can deliver an instruction for stopping the magnetic disk apparatus in the event that the status information delivered thereto indicates that a predetermined level of the airborne particles has been exceeded. It is of course possible that the controller 20 independently and locally stops the associated magnetic disk apparatus without being instructed by the host controller, upon judging that the predetermined allowable level of the content of airborne particles has been exceeded.

The magnetic head slider of the invention can be used not only for the purpose of removing debris and other contaminant particles during operation of a magnetic disk apparatus but also for the purpose of removing various particles during the manufacture of magnetic disks. More specifically, in a magnetic disk production process having a step of applying a medium to the surface of a substrate, a magnetic layer is formed first on the substrate and the surface of the magnetic layer is suitably processed and rinsed. Thereafter, any contaminant particles attracted to the rinsed surface are removed by the magnetic head slider of the invention having the vent holes. Then, after applying a lubricant, the disk is incorporated in the magnetic disk apparatus. The removal of the contaminant particles may be conducted after application of the lubricant.

When the magnetic disk to be produced is of the type which employs a thin film of a medium, contaminant particles attracted onto the disk surface are removed by the magnetic head slider having the vent holes after the application of the thin film. The disk is then mounted in a magnetic disk apparatus. Thus, the magnetic head slider of the present invention can effectively be used for the purpose of cleaning the magnetic disk before the disk is mounted in a magnetic disk apparatus. It is also effective to conduct a cleaning of the magnetic disk by the magnetic head slider of the present invention, even after the mounting of the disk on a spindle of the apparatus, particularly immediately before a cover for shielding the interior of the apparatus from the ambient air is placed.

As will be understood from the foregoing description, the magnetic head slider of the present invention remarkably improves the reliability and the performance of the magnetic disk apparatus, by virtue of the effect for discharging the contaminant particles and the damping effect of the magnetic head slider, thanks to the vent holes formed in the magnetic head slider.

What is claimed is:

1. A magnetic head slider for use with a magnetic recording medium said magnetic head slider carrying a magnetic head and having a bearing surface which opposes to said magnetic recording medium and generates a pneumatic bearing effect for floating said magnetic head slider above a surface of said magnetic recording medium, said bearing surface including a tapered surface portion constituting an air entrance and a flat rail portion connected to said tapered surface portion, characterised in that
    vent holes are formed in said flat rail portion, which penetrate through said magnetic head slider from said flat rail portion to an end surface of said magnetic head slider opposite to said magnetic recording medium.

2. A magnetic head slider according to claim 1, wherein said flat rail portion has two flat rails, and at least one of said vent holes is provided on each of said flat rails.

3. A magnetic head slider according to claim 1, wherein said bearing surface is so designed as to generate a pressure higher than the atmospheric pressure between said flat rail portion and said magnetic recording medium.

4. A magnetic head slider according to claim 1, wherein said bearing surface is so designed as to enable the air once compressed in a gap between said magnetic recording medium and said flat rail portion to expand again within said gap to a pressure lower than the atmospheric pressure.

5. A magnetic head slider for use with a magnetic-recording medium said magnetic head slider carrying a magnetic head and having a bearing surface which opposes to said magnetic recording medium and generates a pneumatic bearing effect for floating said magnetic head slider above a surface of said magnetic recording medium, said bearing surface including a tapered surface portion constituting an air entrance and a flat rail portion connected to said tapered surface portion, characterised in that
    vent holes are formed in said flat rail portion, which penetrate through said magnetic head slider from said flat rail portion to an end surface of said magnetic head slider opposite to said magnetic recording medium, and
    an air guide plate is provided in each of said vent holes.

6. A magnetic head slider according to claim 5, wherein said air guide plate does not project beyond said bearing surface towares said magnetic recording medium but projects from said opposite end surface of said slider.

7. A magnetic head slider according to claim 6, wherein said air guide plate is bent at a projected end portion thereof.

8. A magnetic head slider for use with a magnetic recording medium said magnetic head slider carrying a magnetic head and having a bearing surface which opposes to said magnetic recording medium and generates a pneumatic bearing effect for floating said magnetic head slider above a surface of said magnetic recording medium, said bearing surface including a tapered surface portion constituting an air entrance and a flat rail portion connected to said tapered surface portion, characterised in that
    a plurality of vent holes is formed in said flat rail portion, at least one of said vent holes penetrating through said slider from said flat rail portion to an end surface of said slider opposite to said magnetic recording medium, while the other of said vent holes do not reach said end surface of said slider and serve as pressure regulating holes.

9. A magnetic head slider according to claim 8, wherein said flat rail portion has two flat rails in each of which a plurality of said vent holes is formed.

10. A magnetic head slider according to claim 9, wherein said vent holes are formed in a region near an entrance end of said bearing surface without interfering with said tapered surface portion, in a region near an air exit end of said bearing surface and in a region intermediate between these regions, respectively.

11. A magnetic head slider supporting device comprising:
a magnetic head slider for use with a magnetic recording medium said magnetic head slider carrying a magnetic head and having a bearing surface which opposes to said magnetic recording medium and generates a pneumatic bearing effect for floating said magnetic head slider above a surface of said magnetic recording medium, said bearing surface including a tapered surface portion constituting an air entrance and a flat rail portion connected to said tapered surface portion;
a head slider supporting member elastically supporting said magnetic head slider; and
gimbals member secured to said head slider supporting member and holding said magnetic head slider, characterized in that
said gimbals member is disposed between said head slider supporting member and said magnetic head slider, and
through vent holes are formed to extend from said flat rail portion to said head slider supporting member through said gimbals member.

12. A magnetic disk apparatus comprising:
a magnetic head slider having a bearing surface which opposes to a magnetic recording medium and generates a pneumatic bearing effect for floating said magnetic head slider above a surface of said magnetic recording medium, said bearing surface including a tapered surface portion constituting an air entrance and a flat rail portion connected to said tapered surface portion, and vent holes penetrating said magnetic head slider from said flat rail portion to an end surface of said magnetic head slider opposite to said magnetic recording medium for discharging a part of air compressed between said bearing surface and said magnetic recording medium;
a head slider supporting system including a head slider supporting member which elastically supports said magnetic head slider;
suction means for sucking the air to be discharged from said vent holes in said magnetic head slider;
detecting means connected to said suction means and detecting a content of fine particles contained by said air to be discharged from said vent holes; and
control means for varying an operating condition in accordance with the results from said detecting means.

13. A magnetic head slider apparatus comprising a magnetic head slider for use with a magnetic recording medium, said magnetic head slider carrying a magnetic head and including means forming a bearing surface opposing said magnetic recording medium for generating a pneumatic bearing effect for floating said magnetic head slider above a surface of said magnetic recording medium, said bearing surface means including means providing a tapered surface portion for forming an air entrance part of said bearing surface means and means forming a flat rail portion connected to said tapered surface portion means, said flat rail portion means having at least one vent hole provided therein for penetrating through said magnetic head slider from a bearing surface of said flat rail portion means to an opposite surface of said magnetic head slider.

14. A magnetic head slider apparatus according to claim 13, wherein said flat rail portion means includes two flat rails, and said at least one vent hole is provided on each of said flat rails.

15. A magnetic head slider apparatus according to claim 13, wherein said bearing surface means enables generation of a pressure higher than atmospheric pressure between said flat rail portion means and said magnetic recording medium.

16. A magnetic head slider apparatus according to claim 13, wherein said bearing surface means enables air once compressed in a gap between said magnetic recording medium and said flat rail portion means to expand again within said gap to a pressure lower than atmospheric pressure.

17. A magnetic head slider apparatus according to claim 13, further comprising air guide plate means disposed within a respective vent hole.

18. A magnetic head slider apparatus according to claim 17, wherein said air guide plate means is disposed within a respective vent hole so as to not project beyond said bearing surface of said flat rail portion means toward said magnetic recording medium and includes a portion projecting beyond said opposite surface of said magnetic head slider.

19. A magnetic head slider apparatus according to claim 18, wherein said projecting portion of said air guide plate means is provided with a bent part.

20. A magnetic head slider apparatus according to claim 13, wherein a plurality of vent holes are provided in said flat rail portion means, at least one of said vent holes penetrating through said magnetic head slider from said bearing surface of said flat rail portion means to said opposite surface of said magnetic head slider and at least another one of said vent holes extending from said bearing surface of said flat rail portion means partially through magnetic head slider so as to serve as a pressure regulating hole.

21. A magnetic head slider apparatus according to claim 20, wherein said flat rail portion means includes two flat rails, said plurality of vent holes being provided in each of said flat rails.

22. A magnetic head slider apparatus according to claim 21, wherein three vent holes are formed in each of said flat rails including in a first region proximate to said air entrance part of said bearing surface means without interfering with said tapered surface portion means, in a second region proximate to an air exit of said bearing surface means, and in a third region intermediate said first and second regions, respectively.

23. A magnetic head slider apparatus according to claim 13, further comprising a head slider supporting member elastically supporting said magnetic head slider, gimbal means secured to said head slider supporting member for holding said magnetic head slider, said gimbal means being disposed between said head slider supporting member and said magnetic head slider, said head slider supporting member and said gimbal means being each provided with at least one vent hole disposed so as to extend said at least one vent hole penetrating through said magnetic head slider so as to penetrate through said head slider supporting member and said gimbal means.

24. A magnetic head slider apparatus according to claim 13, wherein said at least one vent hole penetrating through said magnetic head slider enables discharging a part of air compressed between said bearing surface means and said magnetic recording medium so as to effect removal of particles in the air between said magnetic head slider and said magnetic recording medium and to enable said magnetic head slider to stable float above said surface of said magnetic recording medium.

25. A magnetic head slider apparatus according to claim 24, further comprising a head slider supporting system including a head slider supporting member for elastically supporting said magnetic head slider, suction means for sucking the air discharged from said at least one vent hole in said magnetic head slider, detecting means connected to said suction means for detecting a content of fine particles contained by said air discharged from at least one vent hole and providing an output indicative thereof, and control means for varying an operating condition in accordance with the output from said detecting means.

26. A magnetic head slider apparatus according to claim 13, wherein said at least one vent hole penetrates through said magnetic head slider in a direction transverse to said bearing surface of said flat rail portion means.

* * * * *